US012716571B2

(12) United States Patent
Yang et al.

(10) Patent No.: US 12,716,571 B2
(45) Date of Patent: Aug. 25, 2026

(54) APPARATUS AND METHOD FOR HIGH-EFFICIENTLY TUNING THE WAVELENGTH OF LIGHT USING COLLIMATING MODULE INCLUDING AN AXICON LENS

(71) Applicant: IISM INC., Sejong (KR)

(72) Inventors: Il Seung Yang, Sejong (KR); Yun Mi Bae, Sejong (KR); Yu Sic Kim, Sejong (KR); Sung Yun Cho, Sejong (KR); Kwan Kyu Lee, Sejong (KR); Jae Keun Choi, Sejong (KR); Youn Jin Kim, Daejeon (KR); Chang Hyun Bae, Sejong (KR); Sung Dong Kim, Daejeon (KR); Jong Min Park, Sejong (KR); Yun Ji Lee, Sejong (KR); Se Min Park, Daejeon (KR); Hueng Khon Kim, Rowland Height, MO (US)

(73) Assignee: IISM INC., Sejong (KR)

( * ) Notice: Subject to any disclaimer, the term of this patent is extended or adjusted under 35 U.S.C. 154(b) by 380 days.

(21) Appl. No.: 18/158,861

(22) Filed: Jan. 24, 2023

(65) Prior Publication Data

US 2024/0247780 A1 Jul. 25, 2024

(51) Int. Cl.
*F21V 7/00* (2006.01)
*F21Y 115/10* (2016.01)
(Continued)

(52) U.S. Cl.
CPC ............ *F21V 7/0091* (2013.01); *G02B 5/201* (2013.01); *G02B 27/30* (2013.01); *F21Y 2115/10* (2016.08)

(58) Field of Classification Search
CPC ....... F21V 7/0091; G02B 5/201; G02B 27/30; F21Y 2115/10
See application file for complete search history.

(56) References Cited

U.S. PATENT DOCUMENTS 4,447,141 A * 5/1984 Eisenkraft .............. A61B 3/022 351/243
4,776,666 A * 10/1988 Kuehn .................. G09B 27/00 385/115
(Continued)

FOREIGN PATENT DOCUMENTS

CN 116224678 A 6/2023
EP 3978964 A1 4/2022
(Continued)

OTHER PUBLICATIONS

International Search Report and Written Opinion from PCT Application No. PCT/IB2024/050086, dates Apr. 16, 2024, 11 pages.
(Continued)

*Primary Examiner* — Wyatt A Stoffa
(74) *Attorney, Agent, or Firm* — Stinson LLP

(57) ABSTRACT

The present invention provides a light source apparatus and method for integrating diffused light with high efficiency using a collimating including an axicon lens, collimating it, tuning the wavelength of desired light, and passing it. A tunable wavelength light source apparatus of the present invention according to one embodiment comprises a diffuse light source for irradiating diffused light, a collimating module for collimating the light irradiated from the diffuse light source, wherein the collimating module comprises an axicon lens, an angularly tunable bandpass filter module for passing the light that has passed through the collimating module to select a specific wavelength of the light, and a mixing module for correcting a spatial error of a wavelength specified according to an angle of incidence of the light passing through the angularly tunable bandpass filter module.

6 Claims, 11 Drawing Sheets

(51) Int. Cl.
*G02B 5/20* (2006.01)
*G02B 27/30* (2006.01)

(56) References Cited

U.S. PATENT DOCUMENTS 6,332,092 B1 * 12/2001 Deckert ............ G02B 23/2469 600/476
6,523,985 B2 * 2/2003 Hamanaka ........... G02B 6/0008 362/333
7,232,228 B2 * 6/2007 Li ...................... G02B 27/0994 349/9
7,618,158 B2 * 11/2009 Li ........................ F21V 7/0025 362/560
8,059,327 B1 * 11/2011 Erdogan ............. G02B 26/007 359/290
9,581,313 B2 * 2/2017 Finsterbusch ........... F21V 13/14
10,192,144 B2 * 1/2019 Saaski .................... G01N 21/77
11,243,460 B2 * 2/2022 Hu ....................... G03B 21/204
11,330,983 B2 * 5/2022 Lychagov ............. G01J 3/0272
11,676,263 B2 * 6/2023 Lee ..................... G03F 7/70975 348/131
11,955,767 B2 * 4/2024 Sorg .......................... F21K 9/64
2006/0227826 A1 * 10/2006 Balogh .................. G21K 1/062 372/34
2007/0019408 A1 * 1/2007 McGuire, Jr. .......... H04N 9/315 362/231
2008/0123052 A1 5/2008 Su et al.
2009/0027631 A1 * 1/2009 Liu ...................... H04N 9/3114 353/84
2009/0034284 A1 * 2/2009 Li .......................... G03B 33/06 362/293
2010/0097779 A1 * 4/2010 Gladnick .................. G01J 3/10 362/84
2011/0043822 A1 2/2011 Hamano et al.
2012/0307081 A1 12/2012 Dewald
2012/0314295 A1 * 12/2012 Fukuyo .................. G01N 21/64 359/589
2013/0242534 A1 * 9/2013 Pettitt .................. G02B 27/141 362/84
2013/0329426 A1 * 12/2013 Finsterbusch ........ G03B 21/204 362/235
2016/0374565 A1 * 12/2016 Nakajima ............ A61B 5/0095 600/323
2018/0062342 A1 3/2018 Comstock, II et al.
2018/0093914 A1 4/2018 Akarapu et al.
2019/0199981 A1 * 6/2019 Murakami ........... H04N 9/3182
2019/0353314 A1 11/2019 Park et al.
2020/0326238 A1 * 10/2020 Akkus ................ G02B 26/0833
2022/0120861 A1 4/2022 Keller et al.
2022/0146621 A1 * 5/2022 Essling ................... E02F 3/847
2023/0333290 A1 * 10/2023 Zijp ..................... G02B 27/005
2024/0142861 A1 * 5/2024 Pertierra .............. G03B 21/008
2024/0253032 A1 * 8/2024 Wagner .................. C12M 23/48
2024/0391021 A1 * 11/2024 Ito ........................ G02B 27/095

FOREIGN PATENT DOCUMENTS

JP 61235730 A 10/1986
JP 2003215111 A 7/2003
JP 2006017901 A 1/2006
JP 2022108288 A 7/2022
KR 1020110076593 A 7/2011
KR 1020180009211 A 1/2018
WO 2018016759 A1 1/2018

OTHER PUBLICATIONS

Agabekov et al., “Optoelectronic Device for Molecular Orientation of Functional Materials”, Journal of Applied Spectroscopy, vol. 87, No. 6, Jan. 2021, 7 pages.
Extended European Search Report from EP Application No. 24747012.3, dated Dec. 22, 2025, 8 pages.

* cited by examiner

APPARATUS AND METHOD FOR HIGH-EFFICIENTLY TUNING THE WAVELENGTH OF LIGHT USING COLLIMATING MODULE INCLUDING AN AXICON LENS

TECHNICAL FIELD

The present invention relates to light source apparatus and method for integrating diffused light with high efficiency using a collimating module including an axicon lens, collimating it, tuning the wavelength of desired light, and passing it.

BACKGROUND

In an imaging technology or inspection equipment using light, specific information is obtained through a change that occurs after light is irradiated to a specific area. In addition, in an imaging technology or inspection equipment using light, light of a specific wavelength is irradiated depending on the object to be observed, and a phenomenon appearing thereafter is analyzed to obtain specific information.

That is, in the technical field to which the present invention belongs, it is required to irradiate light having linearity. In particular, light of a specific wavelength suitable for information to be obtained from a target is irradiated linearly, and then the change in transmitted or reflected light is measured, or other lights emitted checked and analyzed, so as to obtain information.

In this case, when selecting light for imaging or analysis, a laser having a low divergence angle, i.e., the angle at which light spreads as it travels, and excellent linearity can be used. However, it is expensive and inefficient in that, since the laser has a single wavelength, a plurality of lasers having a specific wavelength in the visible ray region of 400 to 700 nm must be provided. This problem gets worse as the desired wavelength region becomes wider. In order to solve the problems, a dye or a wavelength tunable laser using a nonlinear phenomenon may be used. However, the wavelength tunable laser has the disadvantage of being very expensive and difficult to maintain and change the wavelength.

Meanwhile, it is possible to use a relatively low-cost light source, for example, a general lamp and a light emitting diode (LED), but because it has a wide range of wavelength, it takes additional effort and cost to have a specific wavelength. Further, since the light emitting region is relatively large and the divergence angle is large, it is difficult to make it straight.

More specifically, since most of the light irradiated from the light source is lost and only some light emitted from a specific direction can be used in the process of making the light irradiated from a general lamp and the LED have straightness, the output is significantly lowered and thus, the efficiency is lowered. Specifically, referring to FIGS. 1A and 1B, unlike the case of FIG. 1A in which light travels linearly, in the case of FIG. 1B in which light diffuses into the air, for example, in the case where the light source is a general lamp or LED, it is difficult to convert (ie, collimate) the light into parallel light because aberration occurs according to the angle at which the light spreads at a plurality of points, thereby reducing efficiency.

That is, light used in microscopes or industrial inspection equipment must be collimated, and here, when the light source is a general lamp or LED, the amount of light is greatly lost during the collimating process, which is inefficient.

Therefore, as shown in FIG. 2, in the microscope industry, only some light sources are used through a method called Pin Hole, but this method also has a disadvantage that efficiency is low.

SUMMARY

In the present invention, an object is to provide high-efficiency tunable wavelength light source apparatus capable of selecting a desired wavelength of light while efficiently integrating and collimating light irradiated from a general lamp or LED, which has the advantage of being inexpensive, but can significantly lose the amount of light.

In order to achieve the above-mentioned subject matters, a tunable wavelength light source apparatus according to an embodiment of the present invention comprises a diffuse light source for irradiating diffused light, a collimating module for collimating the light irradiated from the diffuse light source, wherein the collimating module comprises an axicon lens, an angularly tunable bandpass filter module for passing the light that has passed through the collimating module to select a specific wavelength of the light, and a mixing module for correcting a spatial error of a wavelength specified according to an angle of incidence of the light passing through the angularly tunable bandpass filter module.

The angularly tunable bandpass filter module is a circular plate and comprises a plurality of angularly tunable bandpass filters, wherein the plurality of angularly tunable bandpass filters are circularly disposed at the edge of the angularly tunable bandpass filter module, and the selected wavelength band of light passing through the filter is different for each of the plurality of angularly tunable bandpass filters, wherein for selection of a specific wavelength band of light, one of the plurality of angularly tunable bandpass filters may be selected as the angularly tunable bandpass filter module is rotated.

Each of the plurality of angularly tunable bandpass filters is rotated to adjust the angle of incidence of light to a corresponding filter, and the wavelength of light passing through the filter is selected differently depending on the angle of incidence, and light passes through a selected angularly tunable bandpass filter among the plurality of angularly tunable bandpass filters at a specified angle of incidence as the angularly tunable bandpass filter is rotated, so that a specific wavelength within a selected wavelength band of light may be selected.

The tunable wavelength light source apparatus according to the present invention comprises another angularly tunable bandpass filter module, wherein said another angularly tunable bandpass filter module and an angularly tunable bandpass filter of said another angularly tunable bandpass filter module are rotated, so that the bandwidth of a band having the specific wavelength within the selected wavelength band as a central wavelength may be tuned.

The angle of incidence of light to the angularly tunable bandpass filter may be greater than or equal to 0° and less than 90°.

The diffuse light source may be a light emitting diode (LED) or lamp.

The mixing module may be an optical fiber, a liquid light guide, or a rod lens.

A method of providing a tunable wavelength light source according to another embodiment comprises the steps of irradiating diffused light with a diffuse light source, collimating the light irradiated from the diffuse light source with a collimating module, wherein the collimating module comprises an axicon lens, selecting, with an angularly tunable bandpass filter module, a specific wavelength of light by passing the light that has passed through the collimating module, and correcting, with a mixing module, a spatial error of a specified wavelength according to an angle of incidence of light passing through the angularly tunable bandpass filter module.

According to the method of providing a tunable wavelength light source according to the present invention, the angularly tunable bandpass filter module is a circular plate and comprises a plurality of angularly tunable bandpass filters, wherein the plurality of angularly tunable bandpass filters are circularly disposed at the edge of the angularly tunable bandpass filter module, and the selected wavelength band of light passing through the filter is different for each of the plurality of angularly tunable bandpass filters; and the method may further comprise a step of rotating an angularly tunable bandpass filter module, wherein for selection of a specific wavelength band of light, one of the plurality of angularly tunable bandpass filters is selected as the angularly tunable bandpass filter module is rotated.

The method of providing a tunable wavelength light source according to the present invention may further comprise a step of rotating a angularly tunable bandpass filter, wherein each of the plurality of angularly tunable bandpass filters is rotated to adjust the angle of incidence of light to a corresponding filter, and the wavelength of light passing through the filter is selected differently depending on the angle of incidence, and light passes through a selected angularly tunable bandpass filter among the plurality of angularly tunable bandpass filters at a specified angle of incidence as the angularly tunable bandpass filter is rotated, so that a specific wavelength within a selected wavelength band of light is selected.

The method of providing a tunable wavelength light source according to the present invention may further comprise a step of rotating another angularly tunable bandpass filter module, wherein said another angularly tunable bandpass filter module and an angularly tunable bandpass filter of said another angularly tunable bandpass filter module are rotated, so that the bandwidth of a band having the specific wavelength within the selected wavelength band as a central wavelength is tuned.

The angle of incidence of light to the angularly tunable bandpass filter may be greater than or equal to 0° and less than 90°.

In the step of irradiating light, the diffuse light source may be a light emitting diode (LED) or lamp.

In the step of correcting an error according to an angle of incidence of light, the mixing module may be an optical fiber, a liquid light guide, or a rod lens.

According to the present invention described above, diffused light is collimated with a collimating module including an axicon lens, the wavelength of the light collimated with an angularly tunable bandpass filter module being selected, and an error of a wavelength specified according to an angle of incidence of light passing through the angularly tunable bandpass filter module being corrected uniformly with a mixing module, such that a collimated tunable wavelength light source can be obtained at low cost and with high efficiency.

DETAILED DESCRIPTION

Hereinafter, preferred embodiments of the present invention will be described in detail with reference to the accompanying drawings. Advantages and features of the present invention, and methods of achieving them, will become clear with reference to the detailed description of the following embodiments taken in conjunction with the accompanying drawings. However, the present invention is not limited to the embodiments disclosed below, but may be implemented in various different modes, and these embodiments are just provided to make the disclosure of the present invention complete, and to completely inform the person with common knowledge in the art of the scope of the invention, and the present invention is only defined by the scope of the claims. Like reference numbers indicate like elements throughout the specification.

Unless otherwise defined, all terms (including technical and scientific terms) used in this specification may be used in a meaning commonly understood by those of ordinary skill in the art to which the present invention belongs. In addition, terms defined in commonly used dictionaries are not interpreted ideally or excessively unless explicitly specifically defined.

Terminology used herein is for describing the embodiments and is not intended to limit the present invention. In this specification, singular forms also include plural forms unless specifically stated otherwise in a phrase. As used in the specification, "comprises," "comprising," "includes", and/or "including" do not exclude the presence or addition of one or more other elements than the recited elements.

Hereinafter, a light source apparatus and method for tuning the wavelength of light with high efficiency using a collimating module including an axicon lens according to embodiments of the present invention will be described with reference to the accompanying drawings.

Figure 3:
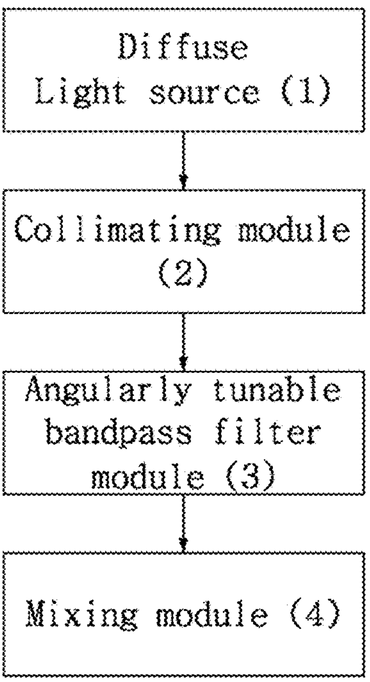
FIG. 3 is a view showing an embodiment of a light source apparatus of the present invention.

Referring to FIG. 3, the light source apparatus of the present invention comprises a diffuse light source 1, a collimating module 2 including an axicon lens 21, an angularly tunable bandpass filter module 3, and a mixing module 4.

Figure 4:
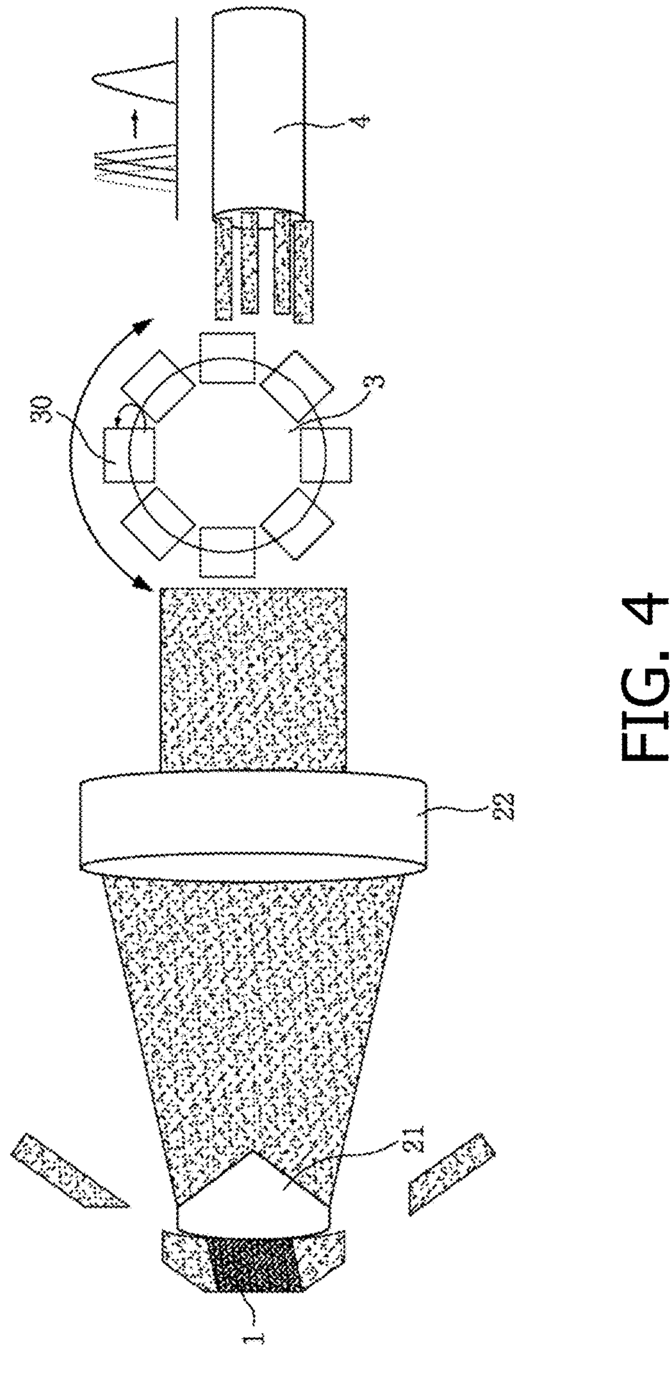
FIG. 4 is a view showing the path of light in a light source apparatus of the present invention as one embodiment.

To be more specific, referring to FIG. 4, in the tunable wavelength light source apparatus of the present invention, light is irradiated from the diffuse light source 1 and diffused, and the light is efficiently integrated and collimated by passing through a collimating module 2 including an axicon lens 21. Thereafter, it passes through an angularly tunable bandpass filter module 3, so that a specific wavelength of light is selected, and it passes through a mixing module 4, so that an error of a wavelength specified according to an angle of incidence of the light on the angularly tunable bandpass filter 3 is corrected.

The collimating module 2 of the present invention comprises an axicon lens 21. In addition, the collimating module 2 of the present invention may further comprise at least one lens 22 in addition to an axicon lens 21. For example, multifocal light irradiated from a multifocal light source is effectively integrated by the axicon lens 21, and the integrated light can pass through the lens 22 and be collimated. The lens 22 that the collimating module 2 of the present invention further comprises is not limited as long as it can integrate and/or collimate light, but may be a convex lens or the like. The collimating module 2 of the present invention may be composed of, for example, one axicon lens 21, two convex lenses that perform a collimation role, and one focusing lens composed of convex lenses. Specifically, the axicon lens 21 integrates light that has a large divergence angle which diffuses into the air so as to narrow the large divergence angle; the two convex lenses collect as much light as possible and then collimate it; and the focusing lens collects as much light as possible and releases it, so as to output light with high energy density.

Figures 1A, 1B:
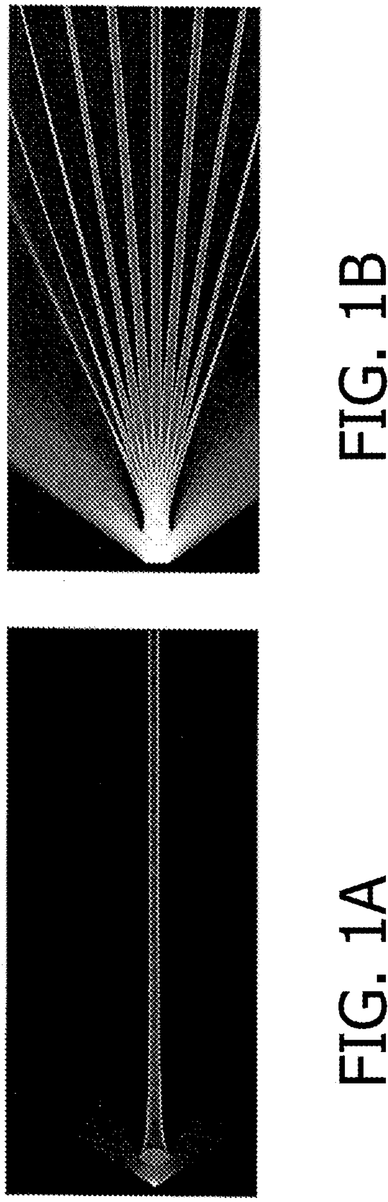
FIG. 1A shows the propagation of light having linearity.
FIG. 1B shows the propagation of diffused light.
Figure 2:
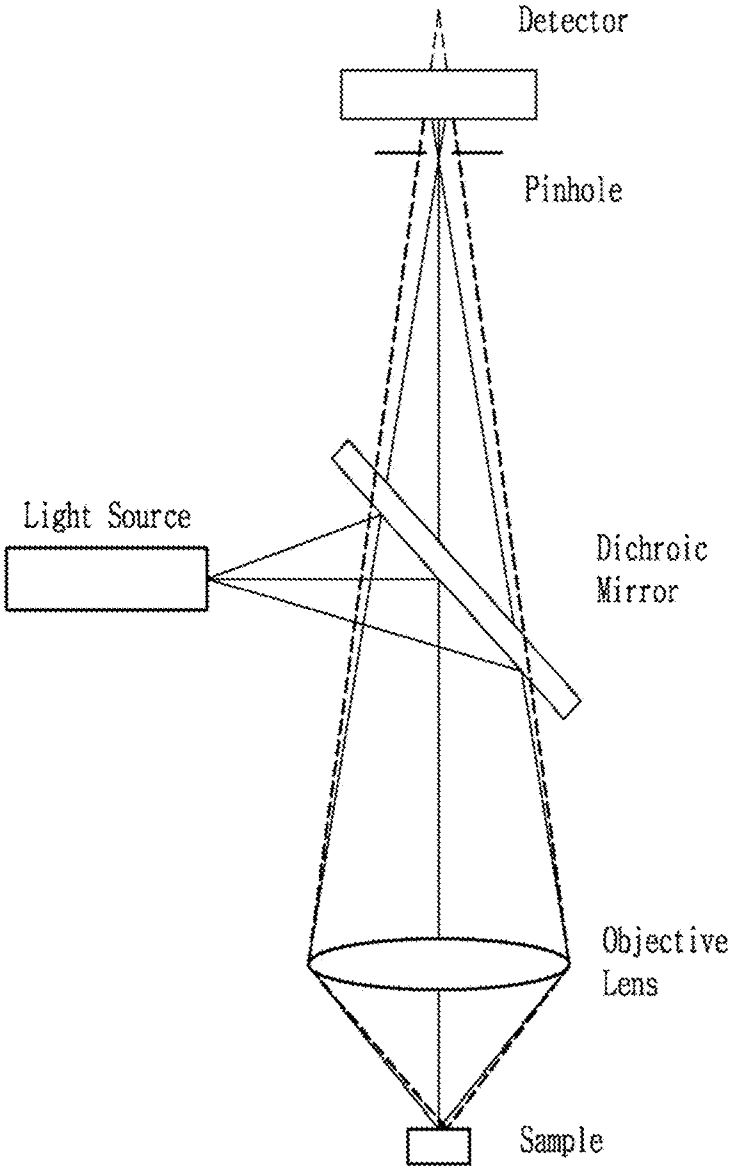
FIG. 2 is a view showing an internal structure of a confocal microscope comprising a pinhole.

The light source of the present invention refers to a diffuse light source 1. Specifically, the diffuse light source 1 refers to all light sources that irradiate diffused light, and the diffused light may have a single or multiple focal point(s). For example, the diffuse light source 1 is a general lamp or a light emitting diode (LED), and light irradiated from the diffuse light source 1 may proceed as shown in FIG. 1B.

The diffuse light source 1 has the advantage of low unit price, but it is difficult to collimate light because aberration occurs depending on the angle at which light spreads from a plurality of points, and even if the diffuse light source is collimated, there is a disadvantage that power loss is large.

Accordingly, the inventor of the present application designed a configuration in which light irradiated from a diffuse light source is passed through a collimating module comprising an axicon lens in order to reduce cost by using a diffuse light source and obtain collimated light with low power loss.

Generally, in the technical field to which the present invention pertains, an axicon lens is often used with a laser beam having linearity. That is, since an axicon lens is generally used to create circular light together with a laser beam, using an axicon lens together with a diffuse light source is not common in the technical field to which the present invention pertains. However, the inventor of the present application has adopted a configuration in which a diffuse light source and an axicon lens are combined, which is not common in the technical field to which the present invention belongs, and found that the light irradiated from the diffuse light source is efficiently integrated as it passes through the axicon lens.

Figure 5:
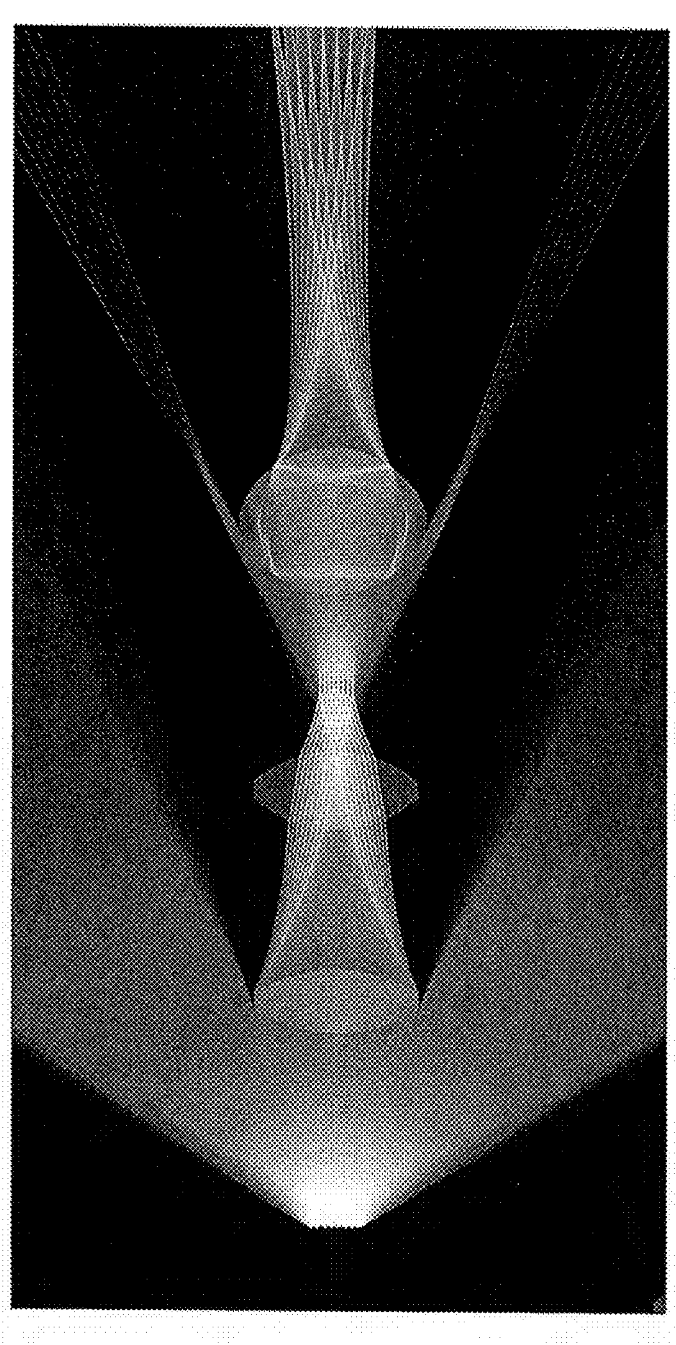
FIG. 5 is a view showing a simulation result of when diffused light has passed through a collimating module not including an axicon lens.
Figure 6:
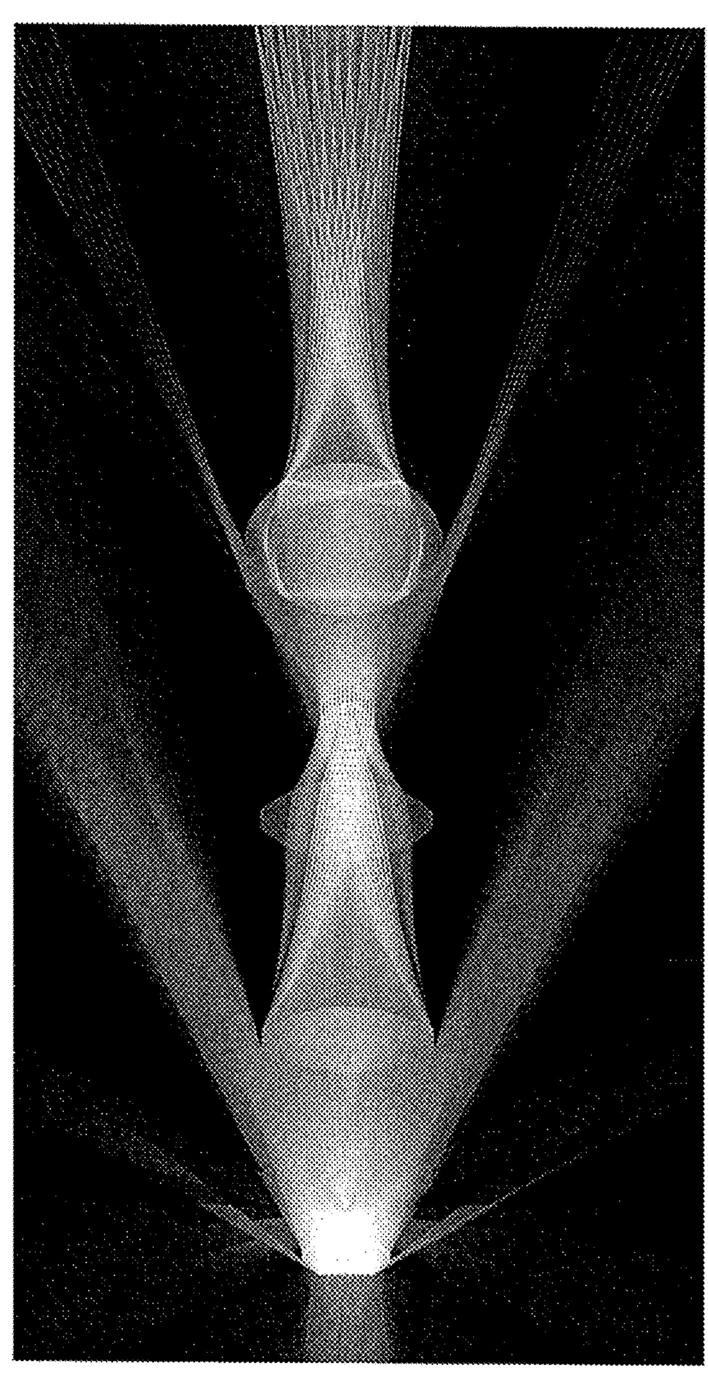
FIG. 6 is a view showing a simulation result of when diffused light has passed through a collimating module including an axicon lens.

Specifically, FIGS. 5 and 6 show the results of calculating the amount of light through simulations in the case of passing light irradiated from a diffuse light source through a collimated module not comprising an axicon lens and a collimated module comprising an axicon lens, respectively. For reference, the present inventor conducted the simulation using Ray Optics Simulation Referring to FIG. 5, the collimated module of FIG. 5 does not comprise an axicon lens. In which case, a significant part of the light irradiated from the diffuse light source does not pass through the collimated module, and only a part of the light irradiated from the diffuse light source passes through the collimated module and is integrated and collimated, and it was confirmed that the energy flow of the output light was 148 cd (candela).

By contrast, referring to FIG. 6, it can be seen that the collimated module of FIG. 6 comprises an axicon lens. In which case, only a part of the light irradiated from the diffuse light source does not pass through the axicon lens, and most of the light irradiated from the diffuse light source passes through the axicon lens and is effectively integrated, and then passes through the lenses included in the collimated module, and integrated and collimated, and it was confirmed that the energy flow of the output light was 197 cd.

That is, through the above simulation results, it was confirmed that the light output when a collimated module comprising an axicon lens is used as shown in FIG. 6 is increased 1.33 times as much as when a collimated module without an axicon lens is used.

In other words, the inventor of the present application can efficiently integrate and collimate light irradiated from a diffuse light source by comprising an axicon lens, which is not normally used for a diffuse light source, in a collimated module, thereby reducing cost and at the same time, overcoming the limitations on the power of diffuse light sources.

The angularly tunable bandpass filter module of the present invention serves to select a wavelength band of light passing through the angularly tunable bandpass filter module. For example, as the light passes through the angularly tunable bandpass filter module, a wavelength of light within a visible ray region of 400 to 700 nm may be selected. As an embodiment, as light passes through the angularly tunable bandpass filter module, a narrow wavelength band of about 2 nm centered at 561 nm may be selected and as another embodiment, a wavelength band of about 10 to 15 nm centered at 561 nm may be selected, and as yet another embodiment, a wavelength band of about 2 nm, or 10 to 15 nm, centered at 512 nm may be selected.

In the present invention, light passing through a collimating module comprising an axicon lens may pass through an angularly tunable bandpass filter module. In addition, light of a specific wavelength selected by passing through the angularly tunable bandpass filter module may be incident on the mixing module.

In addition, the angularly tunable bandpass filter module 3 of the present invention can comprise an angularly tunable bandpass filter 30 as a band-pass filter. The angularly tunable bandpass filter 30 of the present invention can be rotated. For example, the angularly tunable bandpass filter 30 of the present invention can be rotated by a motor, but is not limited thereto, and other configurations than a motor are possible as long as the angularly tunable bandpass filter 30 can be rotated.

In addition, by rotating of the angularly tunable bandpass filter 30 of the present invention, the angle at which light is incident on the angularly tunable bandpass filter 30, that is, the angle of incidence (AOI) of the light to the filter can be set variously. The angle of incidence (AOI) is greater than or equal to 0° and less than 90°, and preferably, the angle of incidence (AOI) may be 0° (normal incidence), 30°, 45° or 60°.

In addition, in the present invention, a wavelength of light passing through the angularly tunable bandpass filter 30 may be selected according to the angle of incidence (AOI). Specifically, as the angle of incidence (AOI) gradually increases from 0°, a wavelength of light output through the angularly tunable bandpass filter 30 tends to gradually shorten. Mathematically, when the angle of incidence (AOI) is θ and neff is an effective index of refraction, which is a specific value depending on the filter configuration and two orthogonal states of polarization, the output wavelength is $$\lambda(\theta) = \lambda(0)\sqrt{1 - \frac{\sin^2\theta}{n_{eff}^2}}$$

Figure 7:
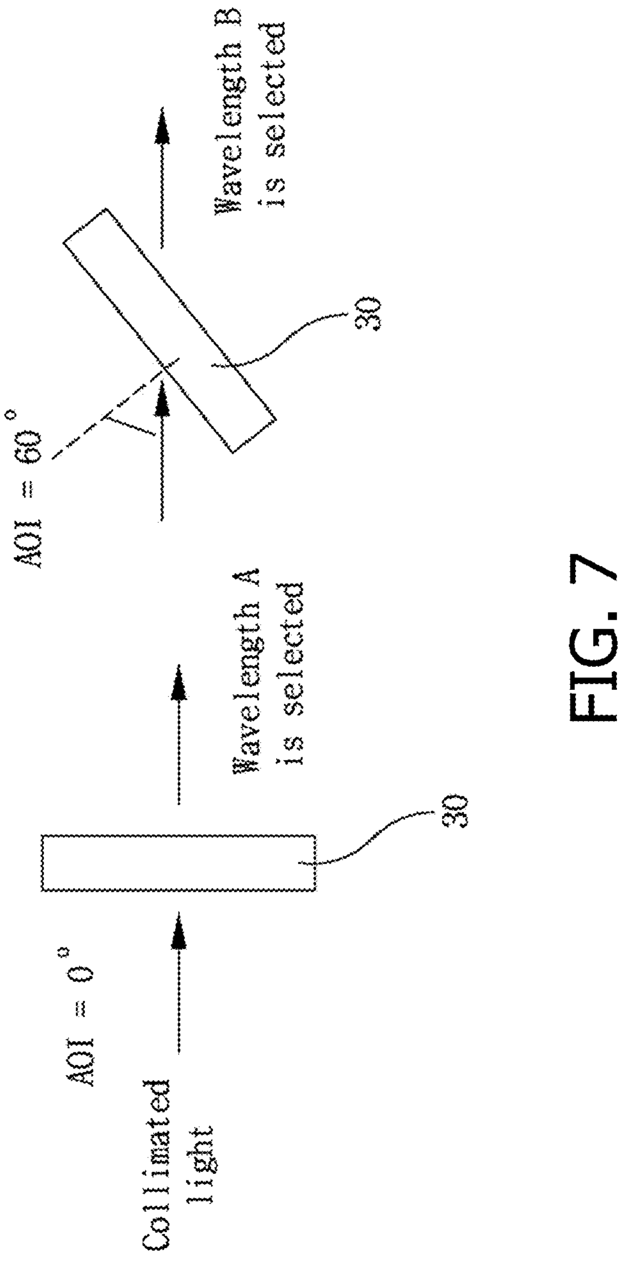
FIG. 7 is a view showing an embodiment of an angularly tunable bandpass filter of the present invention.

More specifically, referring to FIG. 7, when light collimated by passing through the collimating module of the present invention passes through the angularly tunable bandpass filter module 30 at an angle of incidence (AOI) of 0°, the wavelength of the light can be set to have a wavelength band of A. In addition, when light collimated by passing through the collimating module of the present invention passes through the angularly tunable bandpass filter module 30 at an angle of incidence (AOI) of 60, the wavelength of the light can be set to have a wavelength band of B. For example, when the angle of incudence (AOI) is 0°, the center of the wavelength band of the selected light may be about 561 nm, that is, the center of the A wavelength band may be about 561 nm. In addition, when the angle of incidence (AOI) is 60°, the center of the wavelength band of the selected light may be about 512 nm, that is, the center of the B wavelength band may be about 512 nm.

Figure 8:
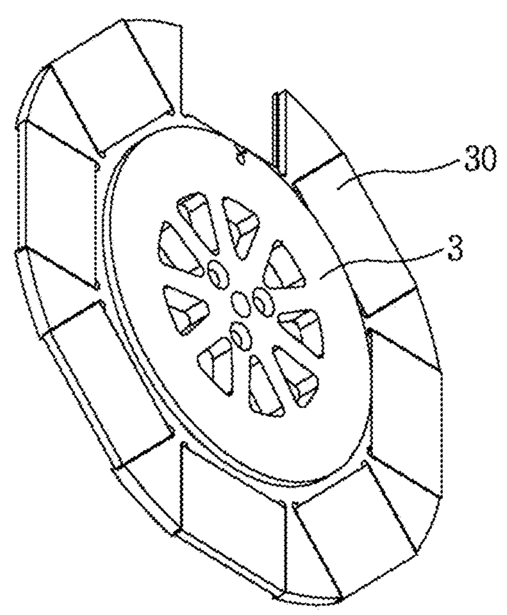
FIG. 8 is a view showing an embodiment of an angularly tunable bandpass filter module of the present invention.

The angularly tunable bandpass filter module 3 of the present invention may be a circular plate. Specifically, it may be a circular plate having a predetermined thickness, and its center may be connected to a motor. Also, the angularly tunable bandpass filter module 3 of the present invention may comprise a plurality of angularly tunable bandpass filters 30. The plurality of angularly tunable bandpass filters 30 may be circularly disposed at the edge of the angularly tunable bandpass filter module 3. For example, the angularly tunable bandpass filter module 3 of the present invention may be in the form shown in FIG. 8. In addition, in the present invention, as the angularly tunable bandpass filter module 3 is rotated manually or automatically by a motor, one of the plurality of angularly tunable bandpass filters 30 can be selected.

For an apparatus comprising the light source device of the present invention, any form is possible as long as it can comprise a diffuse light source, a collimating module comprising an axicon lens, an angularly tunable bandpass filter module, and a mixing module, so that light irradiated from the diffuse light source can be efficiently integrated and collimated.

In the angularly tunable bandpass filter module 3 of the present invention, there are two types of rotational movement.

Figure 9A:
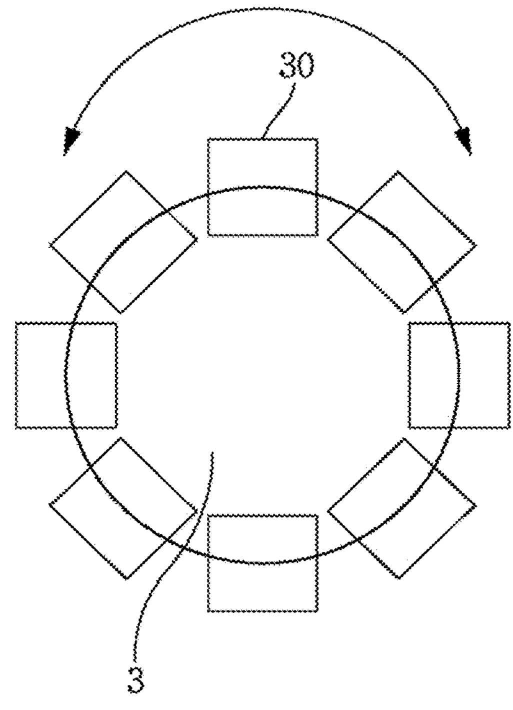
FIG. 9A is a view showing an embodiment of the rotation movement of an angularly tunable bandpass filter module of the present invention.
Figure 9B:
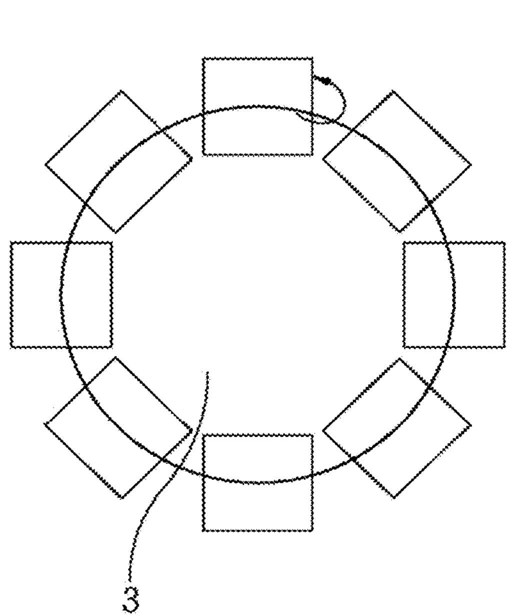
FIG. 9B is a view showing an embodiment of the rotation movement of an angularly tunable bandpass filter of the present invention.
Figure 10:
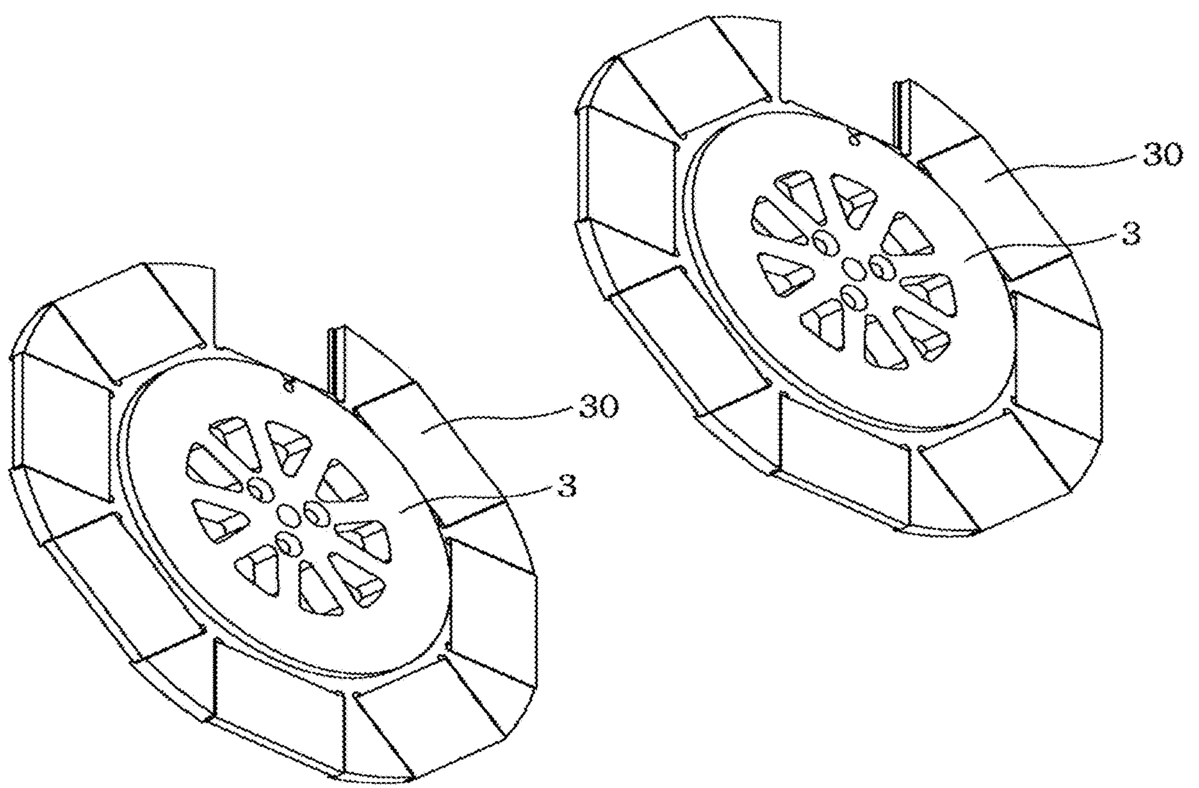
FIG. 10 is a view showing an embodiment including another angularly tunable bandpass filter.

First, referring to FIG. 9A, in the present invention, as the angularly tunable bandpass filter module 3 rotates, one of the plurality of angularly tunable bandpass filters 30 formed at the edge of the angularly tunable bandpass filter module 3 can be selected. Here, one of the plurality of angularly tunable bandpass filters 30 can be selected by means of a motor and/or a control device connected to the angularly tunable bandpass filter module 3. Accordingly, in the present invention, it is possible to select a specific wavelength region of light passing through the angularly tunable bandpass filter module. For example, a wavelength range in which a wavelength of 532 nm is included may be selected.

In terms of effect, since the present invention comprises a plurality of angularly tunable bandpass filters 30 and can select one of them, it can select a variety of a wavelength band of light depending on the inspection target, with a simple configuration.

Next, as mentioned above, the angularly tunable bandpass filter 30 included in the angularly tunable bandpass filter module 3 can also be rotated. As the angularly tunable bandpass filter 30 is rotated, the angle of incidence (AOI) of light on the filter 30 becomes different, and thus, a desired wavelength of light can be selected from the light passing through the filter 30. For example, a wavelength band centered at 532 nm within the above-selected wavelength range including a wavelength of 532 nm may be selected.

That is, in the angularly tunable bandpass filter module 3 of the present invention, there are two types of rotational movements, and by adjusting the two types of rotational movements, the present invention can arbitrarily select a specific wavelength within a desired wavelength range within a wide wavelength range. In other words, in the present invention, the range of wavelengths that can be selected is widened through the angularly tunable bandpass filter module and the configuration of rotating it in two types, and as a result, there is no need for a plurality of light sources (e.g., laser) having a single wavelength, and with a diffuse light source alone having a wide range of wavelengths, it is possible to output a collimated light source having any wavelength.

In addition, the tunable wavelength light source apparatus may further comprise another angularly tunable bandpass filter module. For example, the tunable wavelength light source apparatus of the present invention may comprise angularly tunable bandpass filter modules. In which case, by rotating one angularly tunable bandpass filter module and an angularly tunable bandpass filter of the angularly tunable bandpass filter module, as described above, it can select a specific wavelength within a specific wavelength range. In which case, by rotating another angularly tunable bandpass filter module and an angularly tunable bandpass filter of said another angularly tunable bandpass filter module, it can tune the bandwidth of a wavelength band having a specific wavelength within a selected specific wavelength range as a central wavelength. For example, the bandwidth of the above-selected wavelength band centered at 532 nm may be tuned.

Therefore, by using at least one angularly tunable bandpass filter module and at least one angularly tunable bandpass filter comprised in an angularly tunable bandpass filter module, the present invention has the effects of freely obtaining a desired specific wavelength region, a wavelength band within the specific wavelength region, and a bandwidth thereof.

Meanwhile, even if light irradiated from a diffuse light source of the present invention passes through the collimating module, there is a possibility that the light may not be completely collimated. Specifically, referring to FIG. 11, even after the light irradiated from the diffuse light source has passed through the collimating module, the light beams may not be incident in parallel to the angularly tunable bandpass filter 30. In which case, since the angle of incidence (AOI) of each light ray on the angularly tunable band pass filter 30 is spatially different, in each light ray that has passed through the angularly tunable bandpass filter 30, the wavelength of light selected is varied.

In order to solve this problem, the present invention may comprise a mixing module. In the present invention, in case where light uncollimated even after passing the collimating module passes through the angularly tunable bandpass filter 30 and as a result, undesired wavelengths are selected, the mixing module can play a role of correcting the undesired wavelengths spatially.

Figure 11:
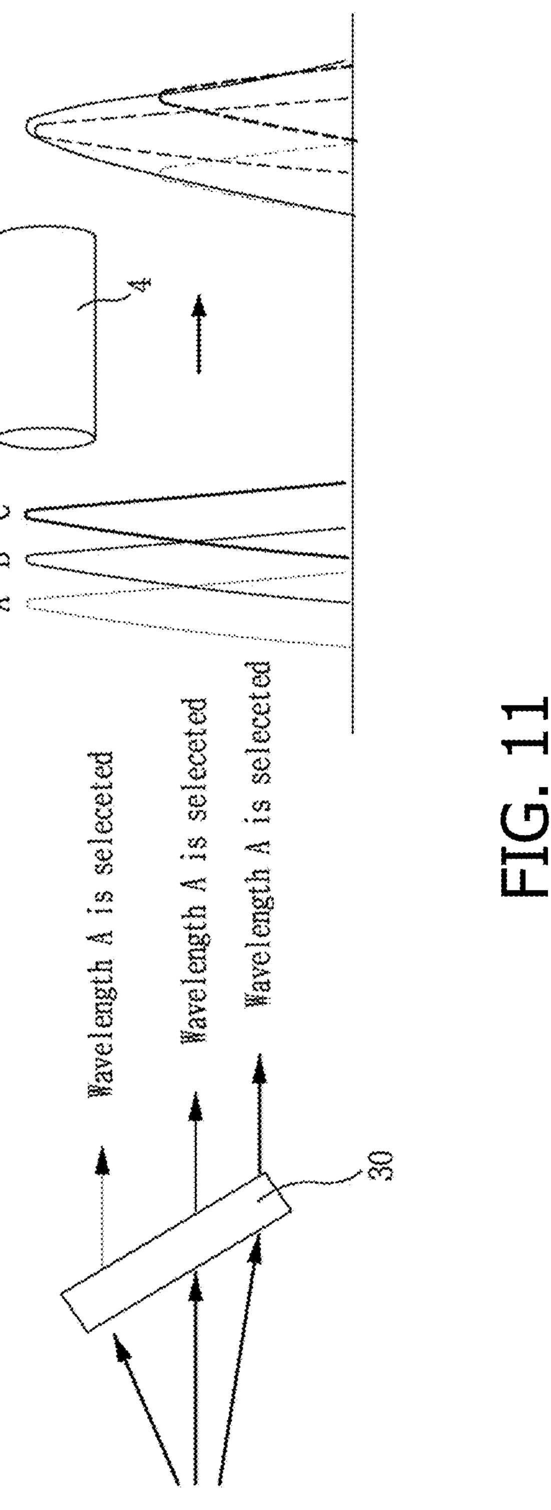
FIG. 11 is a view showing an embodiment of a mixing module of the present invention.

Specifically, referring to FIG. 11, wavelengths of light rays passing through the angularly tunable bandpass filter 30 may be selected as wavelengths A, B, and C, respectively. In which case, the mixing module of the present invention may serve to correct the wavelengths A, B, and C, for example. More specifically, for example, when rays of light that has passed through the collimating module are collimated and thus, incident in parallel on the angularly tunable bandpass filter 30 at the same angle of incidence (AOI), it can be assumed that light having wavelength B is output from the angularly tunable bandpass filter 30. In addition, if the rays of light that has passed through the collimating module are not incident in parallel on the angularly tunable bandpass filter 30 at the same angle of incidence (AOI), but have different angles of incidence (AOI), for example, light having wavelength A, wavelength B, and wavelength C can be output from the angularly tunable bandpass filter 30. Here, the mixing module 4 of the present invention plays a role of correcting the light that has been output from the angularly tunable bandpass filter 30 and has the A, B, and C wavelengths to have wavelength B. That is, the mixing module 4 of the present invention plays a role of outputting the same wavelength no matter at what position in the mixing module light passes through the mixing module 4.

The mixing module of the present invention may be an optical fiber, a liquid light guide, or a rod lens, but is not limited thereto, and various products may be applied.

Next, a method of providing a tunable wavelength light source according to the present invention will be described. The method of providing a light source according to the present invention relates to a method of providing a tunable wavelength light source using the light source apparatus of the present invention.

Specifically, the method of providing a tunable wavelength light source according to the present invention comprises the steps of irradiating diffused light with a diffuse light source, collimating the light irradiated from the diffuse light source with a collimating module, wherein the collimating module includes an axicon lens, selecting, with an angularly tunable bandpass filter module, a specific wavelength of light by passing the light that has passed through the collimating module, and correcting, with a mixing module, an error of a specified wavelength according to an angle of incidence of light passing through the angularly tunable bandpass filter module. Here, in the step of collimating the light irradiated from the diffuse light source, the collimating module comprises an axicon lens.

The step of selecting a specific wavelength of light according to the present invention may further comprise a step of rotating an angularly tunable bandpass filter module. In the step of rotating the angularly tunable bandpass filter module according to the present invention, the angularly tunable bandpass filter module is a circular plate and comprises a plurality of angularly tunable bandpass filters, wherein the plurality of angularly tunable bandpass filters are circularly disposed at the edge of the angularly tunable bandpass filter module, and the selected wavelength band of light passing through the filter is different for each of the plurality of angularly tunable bandpass filters; further, for selection of a specific wavelength band of light, one of the plurality of angularly tunable bandpass filters may be selected as the angularly tunable bandpass filter module is rotated The step of selecting a specific wavelength of light according to the present invention may further comprise rotating an angularly tunable bandpass filter. In the step of selecting a specific wavelength of light according to the present invention, each of the plurality of angularly tunable bandpass filters is rotated to adjust the angle of incidence of light to a corresponding filter, and the wavelength of light passing through the filter is selected differently depending on the angle of incidence, and light passes through a selected angularly tunable bandpass filter among the plurality of angularly tunable bandpass filters at a specified angle of incidence as the angularly tunable bandpass filter is rotated, so that a specific wavelength within a selected wavelength band of light may be selected.

The method of providing a tunable wavelength light source according to the present invention may further comprises a step of rotating another angularly tunable bandpass filter module, wherein said another angularly tunable bandpass filter module and an angularly tunable bandpass filter of said another angularly tunable bandpass filter module are rotated, so that the bandwidth of a band having the specific wavelength within the selected wavelength band as a central wavelength may be tuned.

In the method of providing a tunable wavelength light source according to the present invention, the diffuse light source may be a light emitting diode (LED) or lamp, and the mixing module may be an optical fiber, a liquid light guide, or a rod lens.

Although the embodiments of the present invention have been described with reference to the accompanying drawings, those skilled in the art can realize that the present invention can be implemented in other specific modes without changing the technical spirit or essential features. Therefore, the embodiments described above should be understood as illustrative in all respects and not limiting.

EXPLANATION OF REFERENCE NUMBERS

1: diffuse light source
2: collimating module
3: angularly tunable bandpass filter module
4: mixing module
21: axicon lens
22: lens
30: angularly tunable bandpass filter

The invention claimed is:

1. A tunable wavelength light source apparatus comprising a diffuse light source for irradiating diffused light;

a collimating module for collimating the light irradiated from the diffuse light source, wherein the collimating module comprises an axicon lens;

an angularly tunable bandpass filter module for passing the light that has passed through the collimating module to select a specific wavelength of the light; and a rod lens for mixing a plurality of lights that has passed through the angularly tunable bandpass filter module, wherein the rod lens outputs a light having a single wavelength by mixing the plurality of lights when each of the specific wavelengths of the plurality of lights passing through the angularly tunable bandpass filter module are selected differently according to an angle of incidence of each of the lights, wherein the angularly tunable bandpass filter module is a circular plate and comprises a plurality of angularly tunable bandpass filters, wherein the plurality of angularly tunable bandpass filters are circularly disposed at the edge of the angularly tunable bandpass filter module, and the selected wavelength band of light passing through the filter is different for each of the plurality of angularly tunable bandpass filters, wherein for selection of a specific wavelength band of light, one of the plurality of angularly tunable bandpass filters is selected as the angularly tunable bandpass filter module is rotated, wherein:

each of the plurality of angularly tunable bandpass filters is rotated to adjust the angle of incidence of light to a corresponding filter, and the wavelength of light passing through the filter is selected differently depending on the angle of incidence, and light passes through a selected angularly tunable bandpass filter among the plurality of angularly tunable bandpass filters at a specified angle of incidence as the angularly tunable bandpass filter is rotated, so that a specific wavelength within a selected wavelength band of light is selected, wherein the tunable wavelength light source apparatus further comprises another angularly tunable bandpass filter module facing the angularly tunable bandpass filter module, wherein said another angularly tunable bandpass filter module and an angularly tunable bandpass filter of said another angularly tunable bandpass filter module are rotated, so that the bandwidth of a band having the specific wavelength within the selected wavelength band as a central wavelength is tuned.

2. The tunable wavelength light source apparatus according to claim 1, wherein the angle of incidence of light to the angularly tunable bandpass filter is greater than or equal to 0° and less than 90°.

3. The tunable wavelength light source apparatus according to claim 1, wherein the diffuse light source is a light emitting diode (LED) or lamp.

4. A method of providing a tunable wavelength light source comprising the steps of:

irradiating diffused light with a diffuse light source;

collimating the light irradiated from the diffuse light source with a collimating module, wherein the collimating module comprises an axicon lens;

selecting, with an angularly tunable bandpass filter module, a specific wavelength of light by passing the light that has passed through the collimating module; and mixing, with a rod lens, a plurality of lights that has passed through the angularly tunable bandpass filter module, wherein the step of mixing comprises the step of outputting a light having a single wavelength by mixing the plurality of lights when each of the specific wavelengths of the plurality of lights passing through the angularly tunable bandpass filter module are selected differently according to an angle of incidence of each of the lights, wherein:

the angularly tunable bandpass filter module is a circular plate and comprises a plurality of angularly tunable bandpass filters, wherein the plurality of angularly tunable bandpass filters are circularly disposed at the edge of the angularly tunable bandpass filter module, and the selected wavelength band of light passing through the filter is different for each of the plurality of angularly tunable bandpass filters; and the method further comprises a step of rotating an angularly tunable bandpass filter module, wherein for selection of a specific wavelength band of light, one of the plurality of angularly tunable bandpass filters is selected as the angularly tunable bandpass filter module is rotated, the method further comprising a step of rotating a angularly tunable bandpass filter, wherein each of the plurality of angularly tunable bandpass filters is rotated to adjust the angle of incidence of light to a corresponding filter, and the wavelength of light passing through the filter is selected differently depending on the angle of incidence, and light passes through a selected angularly tunable bandpass filter among the plurality of angularly tunable bandpass filters at a specified angle of incidence as the angularly tunable bandpass filter is rotated, so that a specific wavelength within a selected wavelength band of light is selected, the method further comprising a step of rotating another angularly tunable bandpass filter module facing the angularly tunable bandpass filter, wherein said another angularly tunable bandpass filter module and an angularly tunable bandpass filter of said another angularly tunable bandpass filter module are rotated, so that the bandwidth of a band having the specific wavelength within the selected wavelength band as a central wavelength is tuned.

5. The method of providing a tunable wavelength light source according to claim 4, wherein the angle of incidence of light to the angularly tunable bandpass filter is greater than or equal to 0° and less than 90°.

6. The method of providing a tunable wavelength light source according to claim 4, wherein the diffuse light source is a light emitting diode (LED) or lamp.

* * * * *